UNITED STATES PATENT OFFICE.

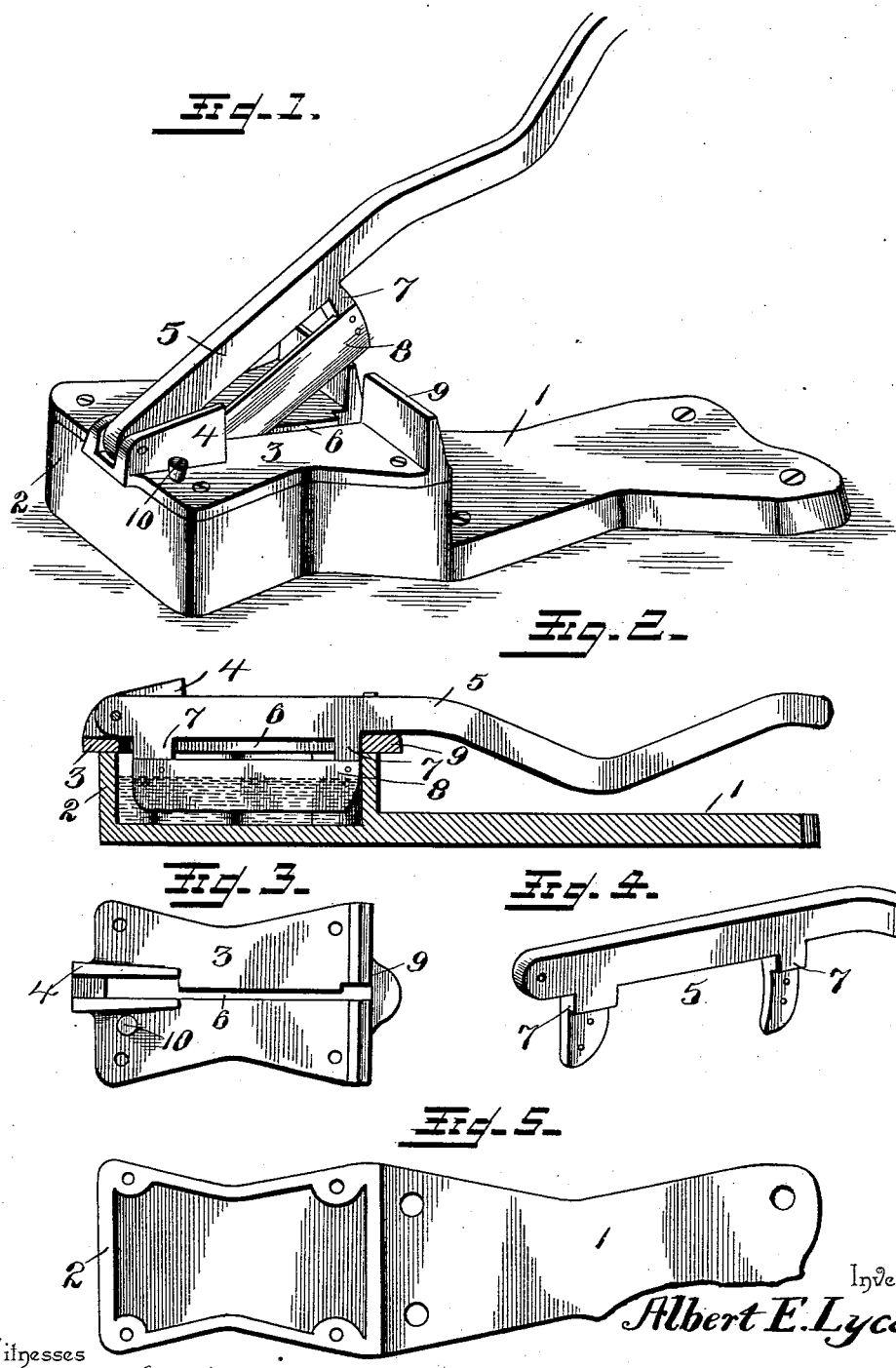

ALBERT E. LYCAN, OF PARIS, ILLINOIS.

DEVICE FOR CUTTING PLUG-TOBACCO.

SPECIFICATION forming part of Letters Patent No. 571,905, dated November 24, 1896.

Application filed July 29, 1895. Serial No. 557,519. (No model.)

*To all whom it may concern:*

Be it known that I, ALBERT E. LYCAN, a citizen of the United States, residing at Paris, in the county of Edgar and State of Illinois, have invented a new and useful Device for Cutting Plug-Tobacco, of which the following is a specification.

My invention relates to a cutting device for plug-tobacco, and particularly to that class of portable cutting devices usually employed in connection with the retail tobacco business; and the object in view is to provide a simple, inexpensive, and efficient apparatus including means for preventing the gumming of the knife or for dissolving the gum therefrom between the times of operating the same in order to insure a clean cut and prevent tearing the plug.

Further objects and advantages of this invention will appear in the following description, and the novel features thereof will be particularly pointed out in the appended claim.

In the drawings, Figure 1 is a perspective view of a tobacco-cutting device constructed in accordance with my invention. Fig. 2 is a longitudinal central section of the same. Fig. 3 is a detail plan view of the removable cap-plate of the reservoir or receptacle. Fig. 4 is a detail perspective view of a portion of the cutter bar or lever. Fig. 5 is a plan view of the base or body portion of the apparatus.

Similar numerals of reference indicate corresponding parts in all the figures of the drawings.

1 designates a base of any ordinary or approved construction, provided contiguous to one end with upstanding flanges 2, forming the walls of a receptacle for water or other solvent, said receptacle being covered to exclude insects and at the same time form a rest for the plug to be cut by a cap-plate 3, provided with a longitudinal guide-slot 6, having enlarged portions at its ends. Rising from the cap-plate contiguous to its front end and respectively upon opposite sides of the guide-slot are bearing-ears 4, between which is fulcrumed the cutter bar or lever 5, said ears being preferably extended rearwardly a considerable distance beyond the fulcrum of the cutter bar or lever in order to form lateral guides for the latter. The cutter bar or lever is adapted when in its inoperative position, as shown in Fig. 2, to rest with its lower edge in contact with the upper surface of the cap-plate, and inasmuch as said bar or lever exceeds the slot in width it is obvious that when the apparatus is not in use the slot will be completely closed and thus prevent the entrance of dust and insects into the interior of the receptacle.

Depending from the cutter bar or lever and preferably integral therewith are hangers or brackets 7, which are preferably rabbeted to form seats for a knife 8, which is rigidly secured thereto, said rabbets being of a depth corresponding with the thickness of the knife, whereby the outer surface of the latter is flush with the corresponding surfaces of the hangers or brackets, and hence between the planes of the side surfaces of the body portion of the cutter bar or lever. Furthermore, the upper edge or back of the knife is spaced from the lower edge of the cutter bar or lever in order to allow a sufficient interval to enable a plug to be severed before said cutter bar or lever comes in contact therewith and also to provide for the submersion of the entire knife, including its upper edge or back, in the liquid contained in the vessel, provided said vessel is entirely filled.

Reference to Fig. 2 will show that when the cutter bar or lever is in its normal or inoperative position the upper edge or back of the knife is below the upper edge of the receptacle or below the plane of the lower surface of the cap-plate, whereby if the vessel is entirely filled the entire knife will be submerged.

Rising from the cap-plate contiguous to its rear edge is a guide-flange 9, adapted to hold the plug in proper position during the operation of the knife, said flange being divided or cut away in alinement with the guide-slot 6 to allow the passage of the knife.

From the above description it will be seen that two important advantages are gained by the construction specified. When not in use, the knife is adapted to be wholly submerged in the liquid contents of the receptacle, whereby the gum adhering thereto is dissolved to insure a clean cut upon the subsequent operation of the cutter bar or lever, a narrow knife-blade being employed, whereby, when depressed, it may be received entirely within the receptacle, and, furthermore, when not in use the guide-slot in the cap-plate of the receptacle is closed to exclude dust and insects.

In order to facilitate the introduction of water or other solvent liquid, I employ an opening in the cap-plate fitted with a removable plug 10.

Various changes in the form, proportion, and the minor details of construction may be resorted to without departing from the spirit or sacrificing any of the advantages of this invention.

Having described my invention, what I claim is—

A cutting device for plug-tobacco, comprising a flat base provided with an integral continuous upstanding flange 2 of a sufficient height to form a liquid-tight receptacle for a solvent liquid, a cap-plate 3 fitted to the upper edges of said flange to cover the open side of the receptacle and provided with a plugged filling-opening, a longitudinal guide-slot 6 having enlarged portions at its ends, a pair of bearing-ears at one end of the slot, and a straight integral upwardly-disposed guide-flange 9 at the edge opposite said ears, a cutter-bar pivotally mounted at one end between the bearing-ears and of a greater width than the guide-slot between its enlarged portions, said cutter bar or lever being provided with a pair of right-angularly-disposed hanger-arms adapted to work in the enlarged portions of the guide-slot to permit that part of the cutter bar or lever between said hanger-arms to rest upon the surface of the cap-plate so as to close the slot and thereby exclude foreign matter from the liquid-receptacle, and a knife-blade attached to said hanger-arms in a plane parallel with the cutter bar or lever and adapted to pass through said guide-slot, whereby when the cutter bar or lever is depressed the knife-blade will be arranged wholly within the receptacle, substantially as set forth.

In testimony that I claim the foregoing as my own I have hereto affixed my signature in the presence of two witnesses.

ALBERT E. LYCAN.

Witnesses:
HIRAM LYCAN,
GEO. W. BABER.